United States Patent Office 3,562,706
Patented Feb. 9, 1971

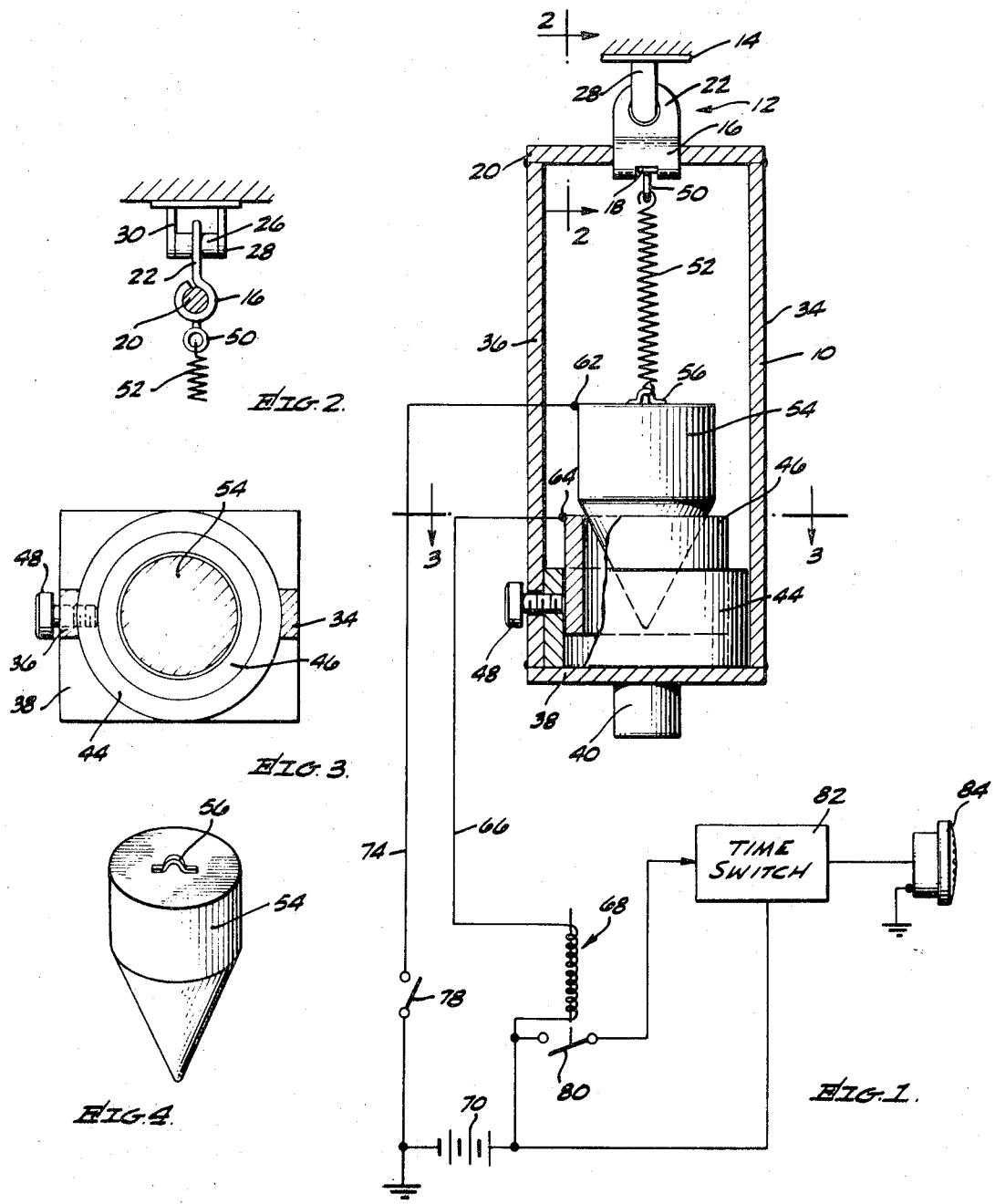

3,562,706
VEHICLE SELF LEVELING VIBRATION
SENSITIVE ALARM DEVICE
Barry D. Mason, 2037 Hollywood Way,
Burbank, Calif. 91505
Filed Feb. 12, 1968, Ser. No. 704,708
Int. Cl. B60r 25/10
U.S. Cl. 340—65                                   7 Claims

ABSTRACT OF THE DISCLOSURE

An automatic alarm comprising an electronic alarm system and a self leveling contact mechanism which includes a vibration sensitive pendulum contact member and a levelable contact member which is adjustable relative to the pendulum contact. The electrical system is energized when the two contact members make electrical contact, which then sounds an alarm such as an automobile horn.

BACKGROUND OF THE INVENTION

This invention relates to automatic vehicle alarm system and more particularly to a novel and improved self-leveling vibration sensitive contact apparatus useful in an automobile alarm system.

Alarm systems useful to give warning when automobiles are disturbed by movement thereof have heretofore been provided whereby motion sensitive contact systems are used to energize an electrical alarm system. These prior art alarm systems have been effective when the vehicle to which they are attached are in a relatively level state, that is, when not parked on a hill. Prior art alarm systems which are adjustable are only adjustable on a particular level and when the level on which the vehicle is parked is changed, these devices do not self adjust to this new level.

The structure of these prior art mechanisms usually consist of a fixedly mounted contact placed in close contact with another contact. When the vehicle is disturbed in any way, such as by the opening or closing of a door or movement of the vehicle, which may be caused by a physical blow thereto, the contacts make connection and thereby engage the alarm system.

SUMMARY OF THE INVENTION

The alarm system of this invention provides a uniquely gimballed swingably mounted pendulum type contact which is placed in a closely spaced contiguous relationship with another contact which is gimballed to the frame of the vehicle whereby a self-leveling system is provided. The contact connected to the housing has an adjustable mechanism which allows the sensitivity of the system to be adjusted to change the spaced relationship of the contacts. The contacts provide apparatus which give a complete 360 degree contact so that no matter which direction the swingably mounted contact moves, it will complete the circuit and sound the alarm.

It therefore becomes one object of this invention to provide a novel and improved automobile alarm system.

Another object of this invention is to provide a novel and improved automobile alarm system which is sensitive to vibration.

Another object of this invention is to provide a novel and improved automobile alarm system which is capable of self-leveling when the automobile to which it is coupled is parked on a hill or other unlevel situation.

These and other objects features and advantages will become apparent to those skilled in the art when taken into consideration with the following detailed description of but one preferred embodiment of this invention and with the drawings wherein like reference numerals indicate like or corresponding parts throughout the several views and wherein:

FIG. 1 is a side view of one preferred embodiment of this invention including a partial electrical schematic of the alarm system;

FIG. 2 is a view taken along the lines 2—2 of FIG. 1;

FIG. 3 is a view taken along the lines 3—3 of FIG. 1; and

FIG. 4 is a perspective view of a particular component shown in FIG. 1.

DESCRIPTION OF ONE PREFERRED EMBODIMENT

Turning now to a more detailed description of but one preferred embodiment of this invention illustrated in FIG. 1, there is shown a frame 10 which is coupled by coupling 12 to the frame 14, or other suitable place, of an automobile.

Coupling 12 comprises a tubular portion 16 which has a slot 18 cut therein. A round bar or rod 20 is affixed to housing 10 by welding or other suitable means and is placed within tubular portion 16 of coupling 12 and is freely moveable therein. Tubular portion 16 has an extension 22 affixed thereto and has a hole 24 therein to receive another rod 26, best shown with reference to FIG. 2. A pair of extensions 28 and 30 are firmly affixed to the automobile frame 14 and to either end of rod 26. The arrangement of coupling 12 thus described allows 2 degrees of freedom for frame 10 to swing.

Frame 10 comprises a pair of extension arms 34 and 36, shown in FIGS. 1 and 3, which is coupled to a plate 38 by welding or other suitable fastening means. A weight 40 is firmly affixed to the bottom of plate 38 which assures that the frame 10 always seeks to level plate 38 by gravity when operating in conjunction with coupling 12.

Mounted on plate 38 and between extensions 34 and 36 is a tubular member 44 and fitted inside tubular housing 44 is a similar tubular member 46 but with a smaller outside diameter to allow a sliding fit within tubular member 44. A thumb screw 48 is threadably mounted into housing 48 and when tightened screw 48 comes to bear upon tubular member 46. Thus by loosening thumb screw 48, up or down adjustment can be made to inner tubular member 46 and thereafter thumb screw 48 is again tightened against inner tubular member 46 to hold it firmly in place.

A hook 50 is affixed to rod 20 and within slot 18 of tubular member 16. Thus the purpose of slot 18 is to allow movement of coupling 12 without interference being caused by hook 50. Coupled to hook 50 is a spring or other suitable resilient member 52. Coupled to the other end of hook 52 is a pendulum weight 54, which is shown in FIG. 4, and which has an eye screw 56 or other suitable means on the top thereof to affix spring 52. Pendulum weight 54 has a conical shape on its bottom or lower end and fits within tubular member 46.

Electrical connections 62 and 64 are made to pendulum weight 54 and inner tubular member 46. An electrical lead 66 is coupled to electrical connection 64 and to one end of a relay 68 which has the other end thereof coupled to a voltage potential in the form of a battery 70. Battery 70 may be the battery within the automobile and be either 6 or 12 volts, depending upon the electrical system of the automobile. An electrical lead 74 is coupled between electrical connection 62 and through a switch 78 and battery 70.

A switch 80 has one end coupled between relay 68 and battery 70 and the other end coupled to a time delay switch 82 shown in block diagram form. Also coupled to time delay switch 82 is a horn 84 which may in fact be the horn which is in the system of the automobile. The time delay switch 82 may be of the type which remains enabled for a predetermined time and then disenables horn 84. Thus, if after a certain time switch 78 is not disconnected, the horn will be disenabled. Such a time delay device can be obtained from Syracuse Electronic Corporation, Model #TSR 13505 and may have a delay of .25 second to 15 seconds, for example.

It should be understood that any alarm mechanism other than a horn may be used, such as a bell or a siren or the like, and not be limited to the automobile horn.

In operation, when physical movement of the vehicle, such as a door slamming or the like, causes vibration or other physical movement of the automobile, a vibration caused by spring 52 and pendulum weight 54 causes a connection between weight 54 and tubular member 46 which causes an electrical circuit to relay 68 to be completed, provided switch 78 is closed. When relay 68 is energized, switch 80 is pulled in and energizes time switch 82, which in turn applies electrical power to horn 84 and thereby sounding the alarm.

The coupling 12, working in conjunction with the weight 46, allows constant stabilization of the unit which includes the contacts comprised of pendulum 54 and inner tubular member 46.

By the apparatus thus described, there is provided a vibration sensitive automobile alarm system which is equally operable regardless of the position which the automobile is parked in because of the self-leveling effect.

It should be understood that but one preferred embodiment of this invention has been described and many modifications thereof may be made without departing from the spirit and scope of this invention.

What is claimed is:

1. A self leveling vehicle alarm system, comprising:
   an electrical alarm means, said alarm means including means for sounding an alarm when said alarm means is energized; and
   a contact unit, said unit including a frame gimbaled to said vehicle, a first contact member being swingably mounted to said frame, said first contact member being a conical shaped electrical conductor resiliently mounted to said frame, a second contact member being fixedly mounted to said first contact member, said second contact member including a tubular shaped insert and being mounted to said frame, the conical shaped first contact member being inserted in a spaced relationship into the tubular portion of said second contact member, said electrical alarm means being coupled to said first contact and to said second contact member.

2. The vehicle alarm system as defined in claim 1 wherein said electrical alarm means comprises:
   a first switching means comprising a first circuit coupled to said first contact member and a second circuit coupled to said second contact member; and
   a second switching means being enabled by said first switching means, said second switching means being coupled between an alarm system and a voltage supply.

3. An electrical contact apparatus comprising:
   a frame, said frame having a top portion and bottom portion, said bottom portion having a weight coupled thereto, said frame being adapted to be mounted by a gimbaled connection thereof;
   a pendulum contact, said contact being a conical shaped electrically conductive member;
   a stationary contact, said stationary contact having a tubular shaped bore therein and being fixedly mounted to said frame near the bottom portion thereof; and
   a coil spring having one end coupled to the top portion of said frame and the other end coupled to said pendulum contact, said pendulum contact being disposed into the tubular shaped bore in said stationary contact and spaced therefrom.

4. The electrical contact apparatus as defined in claim 3 wherein said pendulum contact and said stationary contact are adjustable relative to each other.

5. The electrical contact apparatus as defined in claim 4 and further comprising a tubular member slidably mounted within the tubular bore in said stationary contact.

6. A self leveling sensitivity adjustable alarm apparatus for use on an automobile including:
   a frame;
   means for gimballing said frame to the chassis of said automobile;
   a weight being disposed on one end of said frame so that the frame self levels when the automobile is not level;
   a first contact being fixedly mounted to said frame on the end thereof nearest said weight, said first contact including a vertically disposed tubular bore therein;
   a second contact, said second contact having a portion thereof being conical shaped with the apex thereof being disposed within the bore in said first contact member;
   a spring member having one end coupled to the top portion of said frame and the other end coupled to said second contact to suspend said second contact into the tubular bore of said first contact, and to be spaced from one another; and
   an alarm means being electrically coupled to said first and said second contacts, said alarm means being sounded when said first contact and said second contact physically contact one another.

7. The apparatus as defined in claim 6 and further including:
   an electrical switch being closed when said first and said second contacts contact one another;
   a source of electrical energy; and
   a time switch being enabled by said electrical switch, said time switch being coupled between said source of electrical energy and said alarm means to cause said alarm to sound for a predetermined time interval.

References Cited

FOREIGN PATENTS

| 933,515 | 4/1948 | France | 340—65 |
| 138,916 | 7/1948 | Australia | 340—65 |

ALVIN H. WARING, Primary Examiner

U.S. Cl. X.R.

200—61.44; 180—114